(12) United States Patent
Hageman et al.

(10) Patent No.: US 6,679,356 B2
(45) Date of Patent: Jan. 20, 2004

(54) BRAKE CALIPER BACKDRIVE APPARATUS AND METHOD

(75) Inventors: John B. Hageman, Vandalia, OH (US); Harald Klode, Centerville, OH (US); Paul Rymoff, Jr., Bellbrook, OH (US)

(73) Assignee: Delphi Technologies, Inc., Troy, MI (US)

(*) Notice: Subject to any disclaimer, the term of this patent is extended or adjusted under 35 U.S.C. 154(b) by 128 days.

(21) Appl. No.: 10/057,854

(22) Filed: Jan. 23, 2002

(65) Prior Publication Data

US 2003/0136616 A1 Jul. 24, 2003

(51) Int. Cl.$^7$ .......... F16D 65/36; F16D 55/02; F03G 1/00
(52) U.S. Cl. .......... 188/156; 188/196 F; 188/79.51; 188/71.7; 185/40 A
(58) Field of Search .......... 188/156, 157, 188/158, 166, 196 R, 196 F, 171, 173, 72.3, 1.11 W, 1.11 E, 71.7, 73.1, 73.31, 77 W, 79.51, 79.56, 265; 185/11, 40 R, 40 A, 43, 45

(56) References Cited

U.S. PATENT DOCUMENTS

| | | | | | |
|---|---|---|---|---|---|
| 1,501,677 A | * | 7/1924 | McMahon | .......... | 185/38 |
| 3,984,083 A | * | 10/1976 | McElroy | .......... | 188/188 |
| 4,020,923 A | * | 5/1977 | Taylor | .......... | 185/11 |
| 4,328,871 A | * | 5/1982 | Gluskin | .......... | 173/178 |
| 4,371,058 A | * | 2/1983 | Holley | .......... | 185/11 |
| 4,390,161 A | * | 6/1983 | Nelson | .......... | 188/134 |
| 4,581,987 A | * | 4/1986 | Ulicny | .......... | 185/40 R |
| 4,595,081 A | * | 6/1986 | Parsons | .......... | 185/40 R |
| 4,760,895 A | * | 8/1988 | Wickham | .......... | 185/40 R |
| 4,871,033 A | * | 10/1989 | Odoni et al. | .......... | 173/178 |
| 5,346,045 A | * | 9/1994 | Bennett et al. | .......... | 192/141 |
| 5,572,505 A | * | 11/1996 | Llewellyn | .......... | 185/41 A |
| 5,986,369 A | * | 11/1999 | Hanley et al. | .......... | 185/40 B |
| 6,325,182 B1 | * | 12/2001 | Yamaguchi et al. | .......... | 188/162 |
| 6,340,077 B1 | * | 1/2002 | Schaffer | .......... | 188/156 |
| 6,349,801 B1 | * | 2/2002 | Koth et al. | .......... | 188/72.8 |
| 6,471,017 B1 | * | 10/2002 | Booz et al. | .......... | 188/72.7 |

FOREIGN PATENT DOCUMENTS

WO         WO-9928648 A  *  6/1999

OTHER PUBLICATIONS

US 2002/0092711 to Drennen et al.*

* cited by examiner

*Primary Examiner*—Jack Lavinder
*Assistant Examiner*—Melody M. Burch
(74) *Attorney, Agent, or Firm*—Scott A. McBain

(57) ABSTRACT

The invention provides a brake caliper backdrive apparatus and method of backdriving a brake caliper. The apparatus includes a brake caliper, a motor including a shaft operably attached to the brake caliper and, a biasing member operably attached to the shaft. The biasing member backdrives the motor thereby releasing the brake caliper. The method includes rotating a shaft to clamp the brake caliper, storing energy in a biasing member responsive to the shaft rotation, and reversing the shaft rotation using the stored energy.

5 Claims, 4 Drawing Sheets

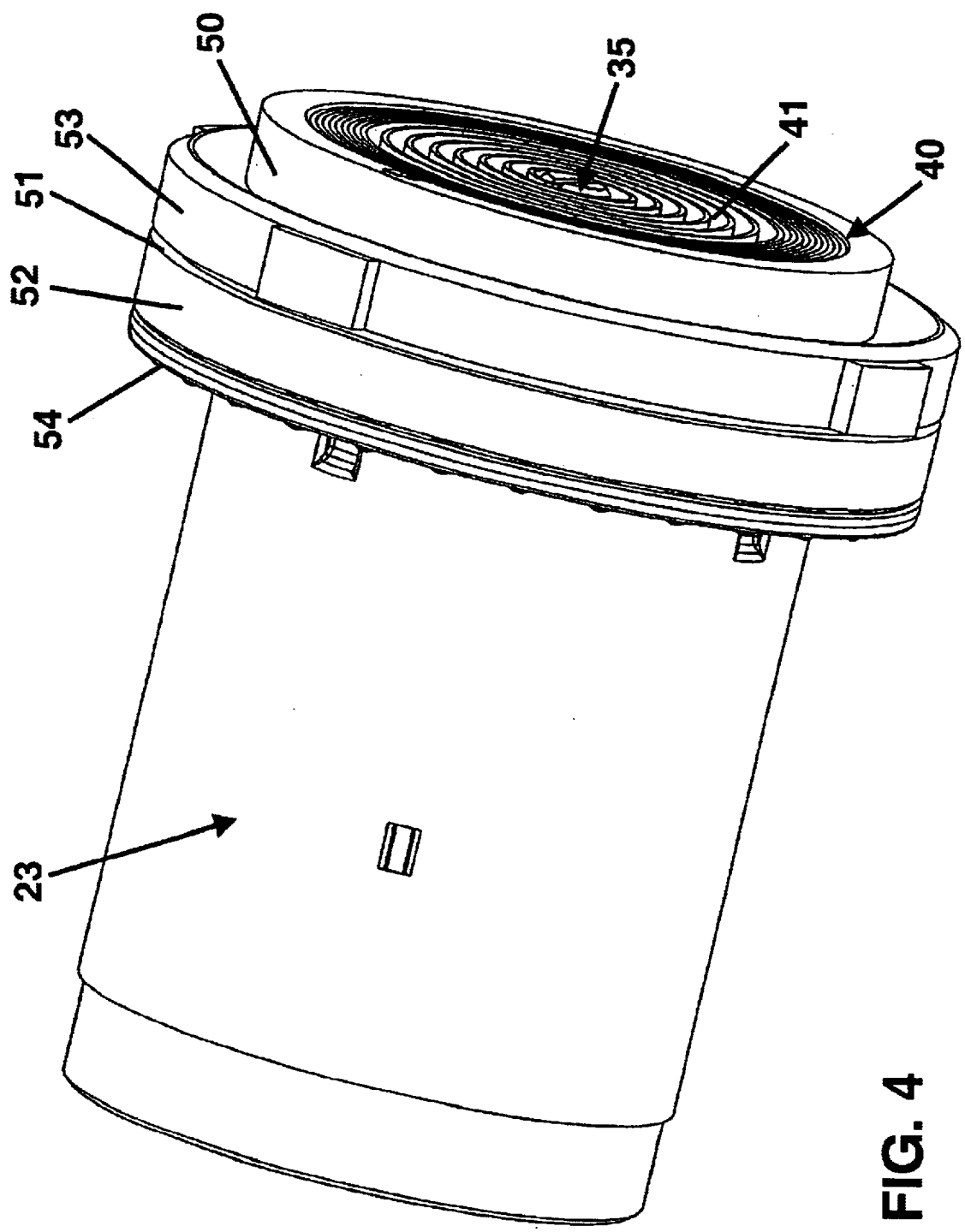

BRAKE CALIPER BACKDRIVE APPARATUS AND METHOD

TECHNICAL FIELD OF THE INVENTION

The present invention relates generally to the field of vehicular brake systems. More particularly, the invention relates to an apparatus and method for backdriving a brake caliper.

BACKGROUND OF THE INVENTION

Virtually all wheeled vehicles utilize braking systems to selectively inhibit wheel rotation and, therefore, reduce vehicle speed. Braking may be accomplished by the use of a disc braking system whereby a friction force is applied at one or more wheel assemblies to inhibit wheel rotation. Numerous disc brake systems are known in the art. The systems generally include a rotor or disc secured to the vehicle wheel, a caliper assembly mounted to the vehicle chassis, and a pair of friction pads disposed on opposing sides of the rotor. Upon activation of the disc brake system, the caliper moves the friction pads toward one another into frictional engagement with the rotor actuating braking force and slowing the vehicle. When the brake is released, the caliper moves (e.g., backdrives) the friction pads out of frictional engagement with the rotor allowing free tire rotation.

Brake-by-wire braking systems may include an electrically powered caliper to actuate braking. Typical electrical caliper designs utilize high gain mechanisms to generate a large clamp load with relatively small motor actuators. During certain conditions, the electrically powered caliper may experience brake "lock-up". For example, failure or power loss of the caliper during a brake apply may produce sustained rotor clamp load. This may inappropriately cause brake drag or prevent the vehicle tire from rotating altogether. Accordingly, it would be desirable to provide a strategy for backdriving a caliper to prevent brake "lock-up" during such conditions.

Repeated brake apply cycles may wear friction pads thereby reducing their overall thickness. Many brake caliper designs compensate for friction pad wear wherein the extent of caliper backdrive is continuously diminished. This permits the friction pad surface to remain in a working proximity to the rotor. Accordingly, it would be desirable for a backdriving strategy to compensate for friction pad wear.

Therefore, it would be desirable to provide an apparatus and method for backdriving a brake caliper that would overcome the aforementioned and other disadvantages.

SUMMARY OF THE INVENTION

One aspect of the present invention provides a brake caliper backdrive apparatus. The apparatus includes a brake caliper, a motor including a shaft operably attached to the brake caliper and, a biasing member operably attached to the shaft. The biasing member backdrives the motor thereby releasing the brake caliper. The biasing member may be a clock spring and may be sized to backdrive a failed motor. The assembly may further include a flange portion operably attached to the brake caliper and the biasing member, wherein the brake caliper release unclamps the flange portion thereby adjusting the biasing member.

Another aspect of the invention provides a method of backdriving a brake caliper. The method includes rotating a shaft to clamp the brake caliper, storing energy in a biasing member responsive to the shaft rotation, and reversing the shaft rotation using the stored energy. The shaft rotation may be reversed during a condition of motor failure, such as a power loss. Reversing the shaft rotation may release the brake caliper. The method may further include compensating for friction pad wear, such as by adjusting the biasing member.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 4 is a perspective view of a portion of the apparatus shown in FIG. 1.

DETAILED DESCRIPTION OF THE PRESENTLY PREFERRED EMBODIMENTS

Figure 1:
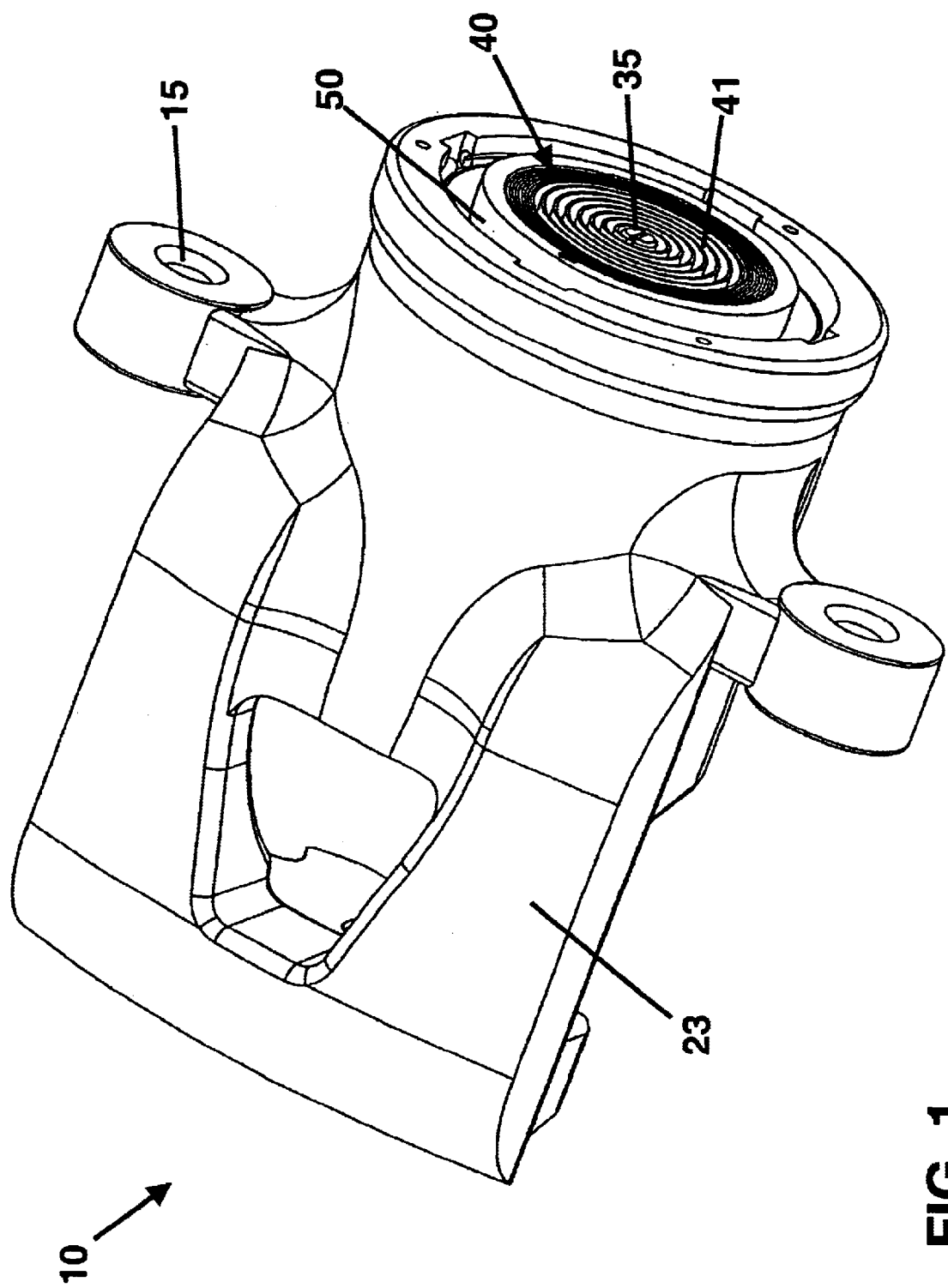
FIG. 1 is a perspective view of a brake caliper backdrive apparatus made in accordance with the present invention.

Referring to the drawings, wherein like reference numerals refer to like elements, FIG. 1 is a perspective view of a brake caliper backdrive apparatus made in accordance with the present invention and shown generally by numeral 10. The apparatus 10 may include mounting means 15 to a vehicle chassis (not shown). In one embodiment, the apparatus 10 may be mounted to the vehicle chassis with a pair of nut and bolt attachments.

Figure 2:
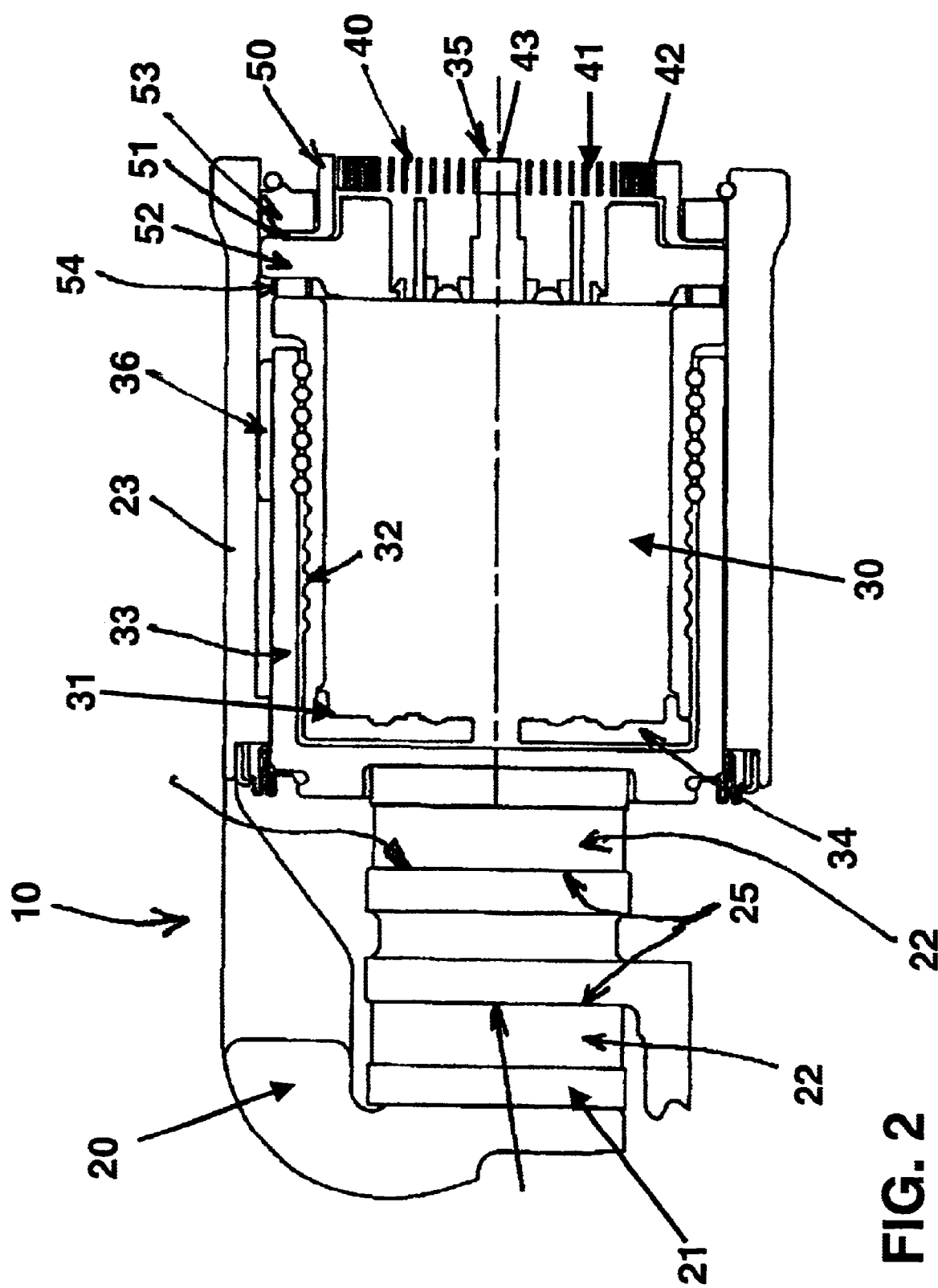
FIG. 2 is a cross-sectional view of the apparatus shown in FIG. 1.

FIG. 2 is a cross-sectional view of the apparatus 10. The apparatus 10 includes a brake caliper 20 and a motor 30 including a shaft 35. The shaft 35 is operably attached to the brake caliper 20. The motor 30 may be positioned within a caliper housing 23. Those skilled in the art will recognize that the brake caliper 20 and motor 30 configurations may be varied while providing effective vehicle braking. Numerous such configurations are currently known for motorized vehicle disc brake systems.

The brake caliper backdrive apparatus 10 further includes a biasing member 40 operably attached to the shaft 35. In one embodiment, the biasing member 40 may be a spring, such as a power spring or, as shown, a clock spring 41 including a plurality of windings. The clock spring 41 may be manufactured from a sufficiently rigid material such as metal, metal alloy, polymer, or the like. Those skilled in the art will recognize that the biasing member may be any number of devices (e.g., springs, coils, or the like) used for storing energy to backdrive the motor 30 for brake caliper 20 release. The biasing member 40 may be sized to backdrive a failed motor 30. For example, the number of windings may determine the amount of energy stored in the clock spring 41 (i.e., greater number of windings typically allows greater energy storage). Accordingly, an appropriate amount of energy may be provided to effectively backdrive the motor 30 and prevent brake "lock-up".

Figure 3:
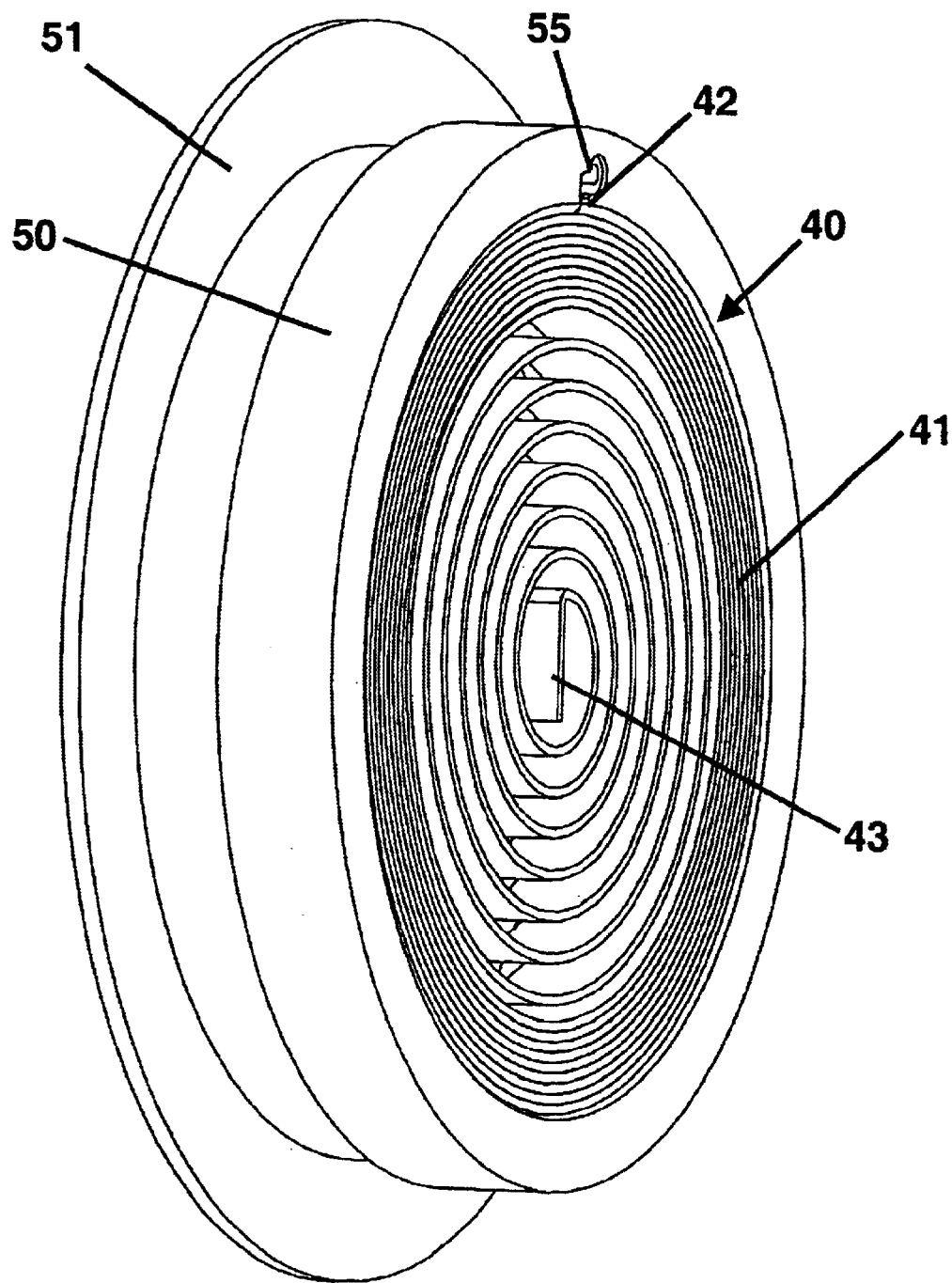
FIG. 3 is a perspective view of a portion of the apparatus shown in FIG. 1.

In one embodiment, the clock spring 40 may be positioned within a spring housing 50. As also shown in FIG. 3, a first clock spring end portion 42 may be operably attached to a spring housing portion 55. A second clock spring end portion 43 may be formed for operable attachment to the shaft 35. Referring again to FIG. 2, a ballscrew 31 may be positioned within the caliper housing 23. The ballscrew 31 may include an inner shaft 32 and an outer shaft 33. An end plate 34 may be operably attached to the ballscrew inner shaft 32 and shaft 35. The shaft 35, end plate 34, and ballscrew inner shaft 32 may rotate together. A guide 36 may be positioned within a channel formed in the caliper housing 23. The guide 36 may prevent rotation of the ballscrew outer shaft 33. A bearing assembly 54 may be positioned between the ballscrew inner shaft 32 and spacer 52. A spring housing flange portion 51 may be positioned between a spacer 52 and a retainer 53 (as also shown in FIG. 4). The brake caliper 20 may include two shoes 21 and friction pads 22 positioned on opposing sides of a disc brake rotor 25.

When the brake is fully released, a gap may be provided between the friction pads 22 and disc brake rotor 25 surfaces. In addition, a gap may be provided between the spring housing flange portion 51 and corresponding spacer 52 and retainer 53 surfaces. The clock spring 41 may be fully unwound.

During brake application, an electrical signal may be received by the motor 30. The motor 30 may be powered on thereby rotating the shaft 35. The shaft 35 may drive planetary gear sets (not shown) resulting in end plate 34 and ballscrew inner shaft 31 rotation. As the ballscrew inner shaft 31 and end plate 34 rotate, the ballscrew outer shaft 33 may move axially toward the disc brake rotor 25. The ballscrew outer shaft 33 movement may be transmitted to the brake caliper 20 resulting in a clamp load between the shoes 21 and friction pads 22 on the disc brake rotor 25. The movement may also produce a reaction load force on the bearing assembly 54 by the ballscrew inner shaft 32. The bearing assembly 54 may push the spacer 52, spring housing flange portion 51, and retainer 53 in contact with one another thereby removing the gap. The spring housing flange portion 51 may be clamped between the spacer 52 and retainer 53 by the load force. Since the first clock spring end portion 42 is attached to the clamped spring housing flange portion 51, the clock spring 41 wraps up as the shaft 35 rotates. Energy is stored in the clock spring 41 as it winds. Should the motor 30 fail during brake application, such as by power loss, the clock spring may provide sufficient energy to effectively reverse shaft 35 rotation (e.g., backdrive the motor 30), release the brake caliper 20 clamp load, and prevent brake "lock-up".

During brake release, the shaft 35 rotation may be reversed thereby releasing the brake caliper 20 clamp load and unwinding the clock spring 41. The ballscrew outer shaft 33 may move back axially away from the disc brake rotor 25. In addition, the spring housing flange portion 51 may eventually unclamp as the reaction load force on the bearing assembly 54 is eliminated. The gap between the spring housing flange portion 51 and corresponding spacer 52 and retainer 53 surfaces may be re-established. The described process may be repeated with each brake application cycle, successively winding and unwinding the clock spring 41.

As the friction pads 22 wear due to use, the shaft 35 may not return to the same start position. Since the spring housing flange portion 51 is unclamped during each brake release, the clock spring 41 may fully unwind and adjust to a new zero load position. As such, the clock spring 41 need only have enough travel for a maximum displacement apply condition and can automatically compensate for friction pad wear.

While the embodiments of the invention disclosed herein are presently considered to be preferred, various changes and modifications can be made without departing from the spirit and scope of the invention. For example, the brake caliper backdrive apparatus configuration may be varied while providing effective vehicle braking. In addition, the biasing member is not limited to any particular spring configuration. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A brake caliper backdrive apparatus, comprising:
   a brake caliper for providing a clamp load;
   a spring housing comprising a spring housing flange portion and a spacer surface and a retainer surface;
   a motor including a shaft, the shaft operably attached to the brake caliper; and
   a spring operably attached to the shaft, wherein the spring backdrives the motor thereby releasing the clamp load during a condition of motor failure.

2. The apparatus of claim 1 wherein the spring comprises a clock spring.

3. The apparatus of claim 1 wherein the spring is sized to backdrive the failed motor.

4. A method of backdriving a brake caliper, comprising:
   providing a spring housing flange portion with a spacer surface and a retainer surface;
   rotating a shaft to clamp the brake caliper;
   storing energy in a biasing member responsive to the shaft rotation; and wherein the biasing member is allowed to fully release the stored energy during brake release during a condition of motor failure by adjusting to a new zero load position.

5. The method of claim 4 wherein the condition of motor failure comprises a power loss.

* * * * *

UNITED STATES PATENT AND TRADEMARK OFFICE
CERTIFICATE OF CORRECTION

PATENT NO. : 6,679,356 B2
DATED : January 20, 2004
INVENTOR(S) : Joe Hageman et al.

It is certified that error appears in the above-identified patent and that said Letters Patent is hereby corrected as shown below:

Column 1,
Line 3, please add the following paragraph before "TECHNICAL FIELD OF THE INVENTION".

-- This invention was made in the performance of a Cooperative Research and Development Agreement with the Department of the Air Force. The Government of the United States has certain rights to use the invention. --

Signed and Sealed this

Fourth Day of May, 2004

JON W. DUDAS
*Acting Director of the United States Patent and Trademark Office*